July 1, 1941.  C. H. SMITH  2,247,894
MANUFACTURE OF MERCAPTOTHIAZOLES
Filed Aug. 8, 1939
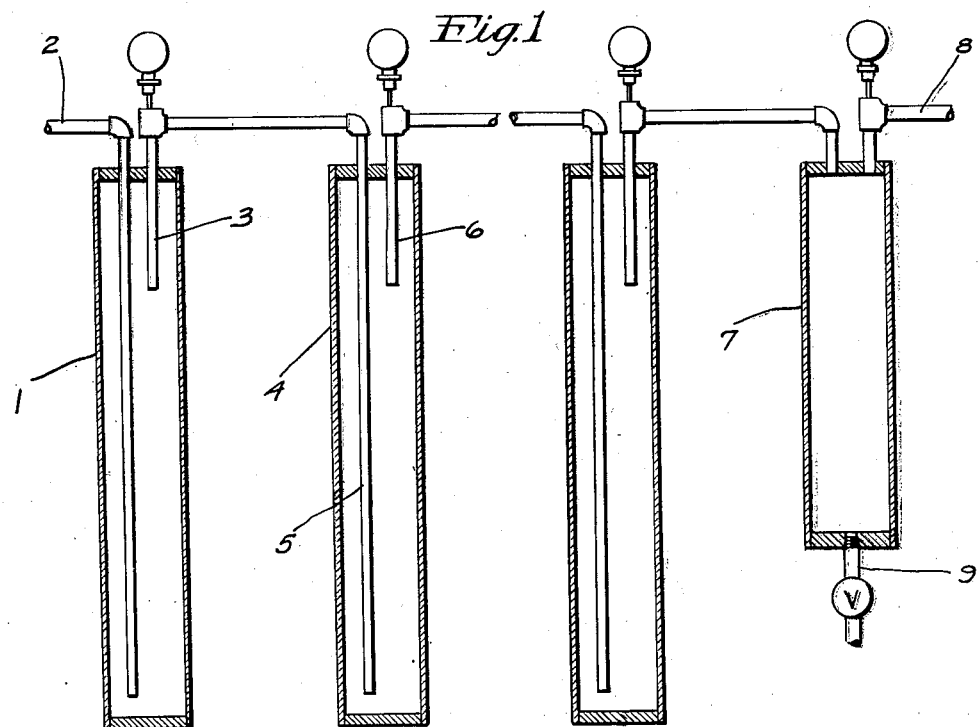
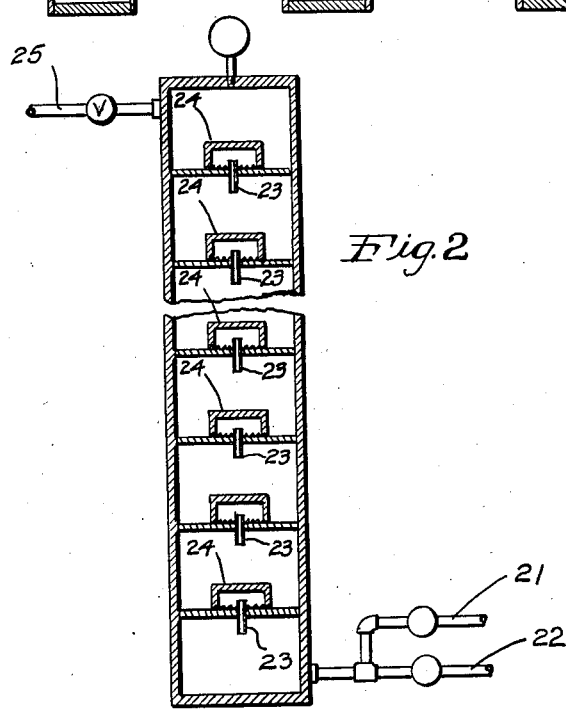
Inventor
Claude H. Smith
By
Attorney Patented July 1, 1941

2,247,894

UNITED STATES PATENT OFFICE 2,247,894

MANUFACTURE OF MERCAPTOTHIAZOLES

Claude H. Smith, Tallmadge, Ohio, assignor to Wingfoot Corporation, Wilmington, Del., a corporation of Delaware Application August 8, 1939, Serial No. 288,967

5 Claims. (Cl. 260—306)

This invention relates to the production of mercaptothiazoles, such as 2-mercaptobenzothiazole, and, more particularly, to a continuous process for preparing mercaptothiazoles in a series of reaction steps or stages.

Mercaptothiazoles, such as 2-mercaptobenzothiazole, are well-known materials and are commercially useful as accelerators of the vulcanization of rubber, pickling inhibitors, corrosion inhibitors, etc. A large number of processes are known whereby these materials may be prepared, in most of which there is an attendant formation of substantial quantities of by-product gases and, in most of which, the reaction is carried out under such conditions that the mass of reactants and resultant products are in a molten state. The present invention is particularly applicable to such processes.

Most of the known methods of preparing mercaptothiazoles are described as batch processes. U. S. 1,911,716 describes apparatus which may be employed in a continuous process. In practice, these known processes have inherent limitations as to efficiency, conversion and product purity and, according to the present invention, mercaptothiazoles may be made continuously with higher yields and higher purity of crude product than by any of these prior processes. Therefore, it is one object of the invention to prepare mercaptothiazoles continuously, with a high degree of conversion of the reactants into the desired product, thereby obtaining a high yield and minimizing re-working of by-products. It is a further object of the invention to obtain crude products of high purity, whereby the amount of processing necessary to obtain final products of a given purity is minimized. It is a further object to prepare mercaptothiazoles efficiently and economically. Other objects and advantages will appear as the description of the invention proceeds.

In the accompanying drawing, two illustrative types of equipment suitable for carrying out the invention are shown semi-diagramatically.

Fig' 1 is a sectional elevation of multi-unit apparatus consisting of a number of separate reactors connected by suitable piping; and Fig. 2 is a sectional elevation of a single unit reactor divided into a series of reaction chambers or compartments vertically disposed one above another.

The practice of the invention is conveniently described in connection with the drawing.

In apparatus of the type illustrated by Fig. 1, a mixture (for purposes of illustration) of aniline and carbon bisulfide containing sulfur dissolved therein is fed into the first unit I through inlet pipe 2, passing to the bottom of the reactor. The reactor being suitably heated, as by an oil jacket or direct heat, the reactants are raised to the temperature of reaction and react as they pass upwardly through the unit. When the liquid level reaches the lower end of pipe 3, it seals off this pipe, forming a gas space in the upper part of the reactor. Thereafter, the by-product gases and unreacted gaseous carbon bisulfide collect in this gas space, building up pressure. The liquid level rises with the influx of fresh reactants until the gas pressure becomes sufficient to force the liquid up into the pipe 3, thereby lowering the liquid level in reactor I to or slightly below the lower end of the pipe 3. The entrance to the pipe 3 is thus exposed and the by-product gases are vented through the pipe until the incoming reactants cause the liquid level to rise and again seal off the bottom of the pipe, confining the remaining gases in the upper part of the reactor. The gas pressure again builds up until it is able to force the liquid up into pipe 3, lowering the liquid level in the reactor until the pipe opening is exposed, more gas then being vented off. This sequence is repeated during the continuous operation of the process with the result that the liquid level in the reactor fluctuates around the lower end of the pipe 3 and the by-product gases collect in the upper part of the reactor and are intermittently vented into the pipe 3. The liquid and gases are thus transferred from reactor I to reactor 4 through pipes 3 and 5 in alternate portions of liquid and gas or, in other words, in the form of slugs of liquid separated by portions of gases. During this transfer from one reactor to the next, highly efficient mixing of the liquids and gases takes place by virtue of mechanical mixing and also by contact of the gases with the liquid films formed by drainage of liquid down the inner walls of pipes 3 and 5. The liquid and gaseous products from reactor I rise through reactor 4, which like reactor I is suitably heated, and undergo further reaction. When the liquid level reaches the lower end of pipe 6, a liquid seal is formed as in reactor I and, thereafter during the continuous operation, the gases collect in the gas space thereby formed and the liquid level fluctuates around the lower end of pipe 6, portions of liquid and gas being intermittently forced over into the next reactor. The reaction mixture progresses in similar manner through each reactor of the series, a certain portion of the total reaction taking place in each unit, the reaction mass approaching completion or equilibrium as it progresses through the system. The by-product gases are temporarily restrained in the gas-space of each unit and, in venting over to the next unit, serve to thoroughly agitate and mix the liquid products of the reaction, the gases themselves also being thoroughly mixed with the liquids. The temporary collection of the gases in each reactor restrains the gases from too rapid passage through and separation from the liquids; the agitation between units causes thorough intermingling of the reactants, including gaseous reactants, and insures efficient utilization of all components before any of the reaction mass passes out of the system. Control of the pressure by venting the gases from each reactor into the next reactor of the series, instead of to the atmosphere as is customary in batch or single unit operation, prevents loss of vaporized reactants, effects better control of the reaction, and increases the efficiency of conversion. After the reaction mass has passed through a sufficient number of reactors to obtain the desired degree of reaction, the products may be conveniently separated and recovered in a separator 7, from which the gases are drawn off at 8 and the liquids are drawn off at 9. When, as in this example, aniline, carbon bisulfide and sulfur are used as the starting materials, the liquid product will consist of molten 2-mercaptobenzothiazole, which may be collected in trays and cooled or discharged into water or otherwise treated in any desired manner.

When apparatus of the type represented by Fig. 2 of the drawing is used, the starting materials are fed in at the bottom of the unit. For example, aniline and a solution of sulfur in carbon bisulfide may be separately supplied in appropriate proportions through pipes 21 and 22. The reactor being suitably heated, the materials react as they pass upwardly through the series of reaction chambers or compartments. In each compartment, the liquid level fluctuates around the lower end of pipe 23, the gases collecting in the gas space formed when the liquid seals off the opening of the pipe. When the pressure builds up sufficiently, liquid is forced up into the pipe, freeing the opening of the pipe and partially venting the accumulated gases. In this manner, portions of gas and liquid are carried from each compartment to the next. Mixing of the materials and distribution may be facilitated by the use of caps 24, similar to the bubble caps in a bubble-plate fractionating column. The uppermost chamber of the apparatus may be a separator or the mixture of gases and liquids may be drawn off through pipe 25 to be separated and/or further treated.

Although, in the foregoing description, the practice of the invention has been described with particular reference to the preparation of 2-mercaptobenzothiazole from aniline, carbon bisulfide and sulfur, the process is equally applicable to the preparation of other mercaptoarylenethiazoles by the reaction of carbon bisulfide, sulfur and other primary aromatic amines having a free ortho position. The process is also applicable generally to the preparation of mercaptothiazoles by any reaction in which the main portion of the reaction mixture is liquid (although some of the reactants or products may be, in whole or in part, in gaseous form) and in which substantial quantities of by-product gases are formed in the reaction. The process is particularly applicable to reactions in which the reaction mixture consists of a molten mass.

Thus, 2-mercaptobenzothiazole may be prepared from aniline, sulfur and carbon bisulfide as described in U. S. Patent 1,631,871; from dianilinomethane, sulfur and carbon bisulfide as described in U. S. Patent 1,891,198; from formanilide and sulfur, with or without carbon bisulfide, as described in U. S. Patent 2,070,522; from thiocarbanilide, carbon bisulfide and sulfur dichloride as described in U. S. Patent 1,906,112; from anilinobenzothiazole and hydrogen sulfide as described in U. S. Patent 1,858,344; from phenyl mustard oil and sulfur as described in U. S. Patent 1,753,898; from diphenylthiourea, carbon bisulfide and sulfur as described in U. S. Patent 1,712,968; from anhydroformaldehyde-aniline and sulfur as described in U. S. Patent 1,972,963; from o,o'-diaminodiphenyldisulfide and carbon bisulfide as described in U. S. Patent 1,865,477; from aniline sulfite, aniline and carbon bisulfide as described in U. S. Patent 2,123,841; and from aniline, nitrobenzene, sulfur and carbon bisulfide as described in Org. Chem. Ind. (USSR) vol. 2, pages 413-415 (1936). Mercaptothiazoles other than 2-mercaptobenzothiazole may be prepared by appropriate selection of the starting materials as described in the foregoing references. The present invention may be employed with any of these mixtures of reactants or other similar processes, being applicable, as previously stated, to any process for preparing mercaptothiazoles in which the reaction mass is liquid and in which substantial quantities of gases are produced in the reaction. It is particularly applicable to those processes which are carried out at superatmospheric temperature and pressure and in which the reaction mass is in molten form.

What I claim is:

1. In a process for preparing 2-mercaptoarylthiazoles by a reaction in which the reaction mass and product are maintained in liquid condition while producing substantial quantities of by-product gas, the improvement which comprises continuously introducing reactants into the reaction system, passing the reactants in concurrent flow through each of a series of reactors and in concurrent flow through the reactors in series, withdrawing the liquid and gaseous reactants and reaction products from each reactor through a conduit, causing said reactants and reaction products to mix in said conduit, introducing this mixture below the surface of the liquid in the succeeding reactor and continuously drawing off the final product from the last reactor in the series.

2. In a process for preparing 2-mercaptoarylthiazoles by a reaction in which the reaction mass and product are maintained in liquid condition while producing substantial quantities of by-product gas, the improvement which comprises continuously introducing reactants into the reaction system, passing the reactants in upward concurrent flow through each of a series of reactors and in concurrent flow through the reactors in series, withdrawing the liquid and gaseous reactants and reaction products from the top of each reactor through a conduit, causing said reactants and reaction products to mix in said conduit, introducing this mixture into the bottom of the succeeding reactor below the surface of the liquid therein and continuously drawing off the final product from the last reactor in the series.

3. In a process for preparing 2-mercaptobenzothiazole by reacting aniline, sulfur and carbon bisulfide under such conditions that the reaction mass and 2-mercaptobenzothiazole are maintained in liquid condition while producing substantial quantities of by-product gas, the improvement which comprises continuously introducing aniline, sulfur and carbon bisulfide into the first of a series of reactors, passing the reactants in upward concurrent flow through each of the reactors and in concurrent flow through the reactors in series, withdrawing the liquid and gaseous reactants and reaction products from each reactor through a conduit, causing said reactants and reaction products to mix in said conduit, introducing this mixture below the surface of the liquid in the succeeding reactor and continuously removing 2-mercaptobenzothiazole from the last reactor in the series.

4. In a process for preparing 2-mercaptoarylthiazoles by a reaction in which the reaction mass and product are maintained in liquid condition while producing substantial quantities of by-product gas, the improvement which comprises continuously introducing reactants into the reaction system, passing the reactants in upward concurrent flow through each of a series of reactors and in concurrent flow through the reactors in series, collecting the gas in a gas space at the top of each reactor, withdrawing the liquid and gaseous reactants and reaction products from the top of each reactor through a conduit, causing said reactants and reaction products to mix in said conduit, introducing this mixture into the bottom of the succeeding reactor below the surface of the liquid therein and continuously drawing off the final product from the last reactor in the series.

5. In a process for preparing 2-mercaptoarylthiazoles by a reaction in which the reaction mass and product are maintained in liquid condition while producing substantial quantities of by-product gas, the improvement which comprises continuously introducing reactants into the reaction system, passing the reactants in upward concurrent flow through each of a series of reactors and in concurrent flow through the reactors in series, collecting the gas in a gas space in the top of each reactor, withdrawing the liquid and gaseous reactants and reaction products from the top of each reactor, mixing said reactants and reaction products, introducing this mixture into the bottom of the succeeding reactor below the surface of the liquid therein and continuously drawing off the final product from the last reactor in the series.

CLAUDE H. SMITH.